United States Patent [19]
Vaca

[11] 3,912,249
[45] Oct. 14, 1975

[54] CAKE FROSTING DEVICE

[76] Inventor: Humberto Vaca, 11874 College, Detroit, Mich. 48205

[22] Filed: Jan. 6, 1975

[21] Appl. No.: 538,570

[52] U.S. Cl. ............... 269/54.5; 118/500; 206/493; 269/289; 269/321 A; 269/321 W
[51] Int. Cl.² ......................................... B25B 11/00
[58] Field of Search .......................... 269/53–54.5, 269/289, 321 A, 321 W; 206/493, 477; 118/500, 502

[56] References Cited
UNITED STATES PATENTS

| | | | |
|---|---|---|---|
| 1,806,887 | 5/1931 | Bruno | 269/54.5 |
| 1,939,342 | 12/1933 | Edwards | 206/493 |
| 2,020,534 | 11/1935 | Brown | 206/477 |
| 2,873,780 | 2/1959 | Schor | 269/54.4 |
| 2,924,330 | 2/1960 | Ballard | 269/53 |
| 3,420,210 | 1/1969 | Lindquist | 118/500 |

Primary Examiner—Al Lawrence Smith
Assistant Examiner—Robert C. Watson
Attorney, Agent, or Firm—Barnes, Kisselle, Raisch & Choate

[57] ABSTRACT

A pedestal and cake plate removably supported thereon have an engaged slot and lug which maintains a relative rotative position in which holes in the plate are each vertically aligned above a guide on the pedestal base. The under side of the plate has sets of converging ribs each of which guides the end of a pin inserted under the plate to a hole. When the pin is then swung downwardly onto the base and against the guide, it is vertically oriented for vertical upward movement through the hole to impale cake layers on the plate and prevent lateral movement thereof to facilitate icing.

19 Claims, 5 Drawing Figures

U.S. Patent    Oct. 14, 1975    3,912,249
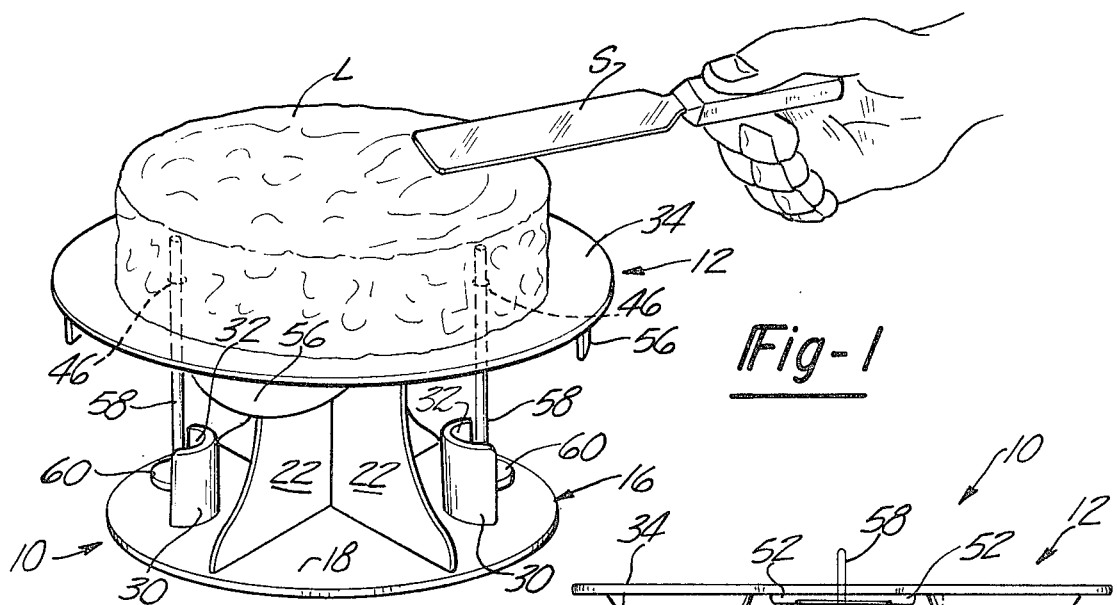
Fig-1
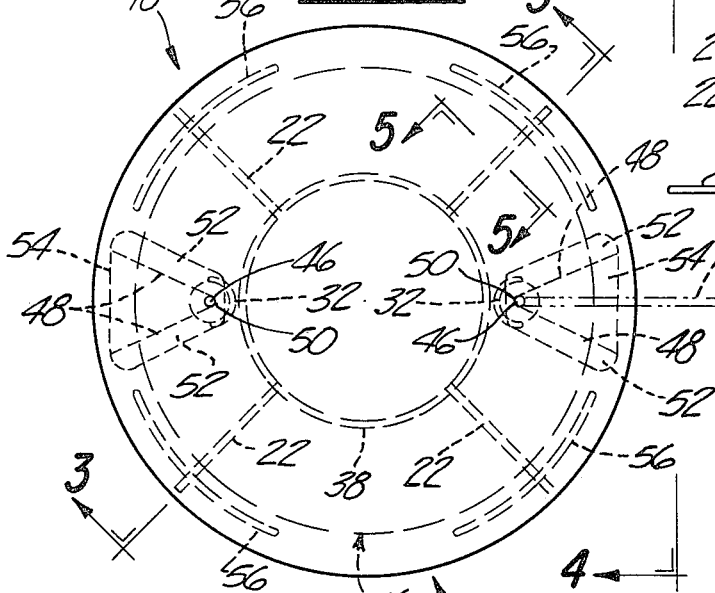
Fig-2
Fig-4
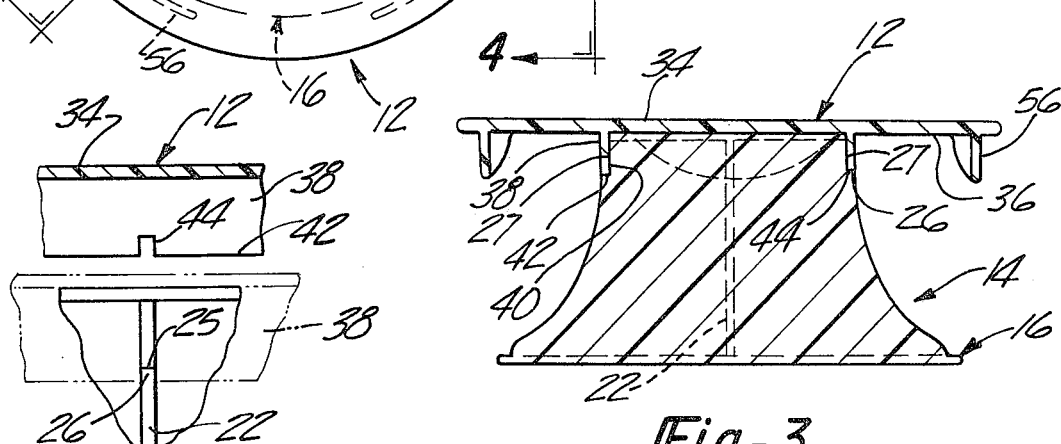
Fig-5
Fig-3

CAKE FROSTING DEVICE

This invention relates generally to a device which facilitates applying icing to layers of a cake. More particularly, the invention involves such a device wherein vertical pins are provided on a cake plate upon which the cake layers are impaled to prevent them from shifting around laterally when the icing is spread on the layers by means of a spatula, or the like.

Conventionally, such pins are mounted to project upwardly from the cake plate, and the cake layer or layers are then forced downwardly over them. If the pins are long enough to penetrate into two or three layers, they project upwardly from the first and/or second layer and interfere with icing of the tops of those layers. Alternatively, pins of different lengths must be used to avoid penetration through the tops of the lower layers being iced. Moreover, to remove the pins from an iced cake, the conventional cake plate and cake thereon must be bodily elevated to enable the pins to be drawn downwardly out of the cake and the plate. This is an inconvenient and delicate procedure during which the plate may tilt, causing the cake to slide off of it.

The object of the present invention is to provide a relatively simple, inexpensive cake frosting device improved so that (1) pins of the same length can be used for icing different numbers of cake layers without interference with icing of the layer tops, (2) the pins can be withdrawn from the cake while it and its plate remain stationary on a stable support, and (3) the pins with utmost convenience can be positioned and manipulated for impaling the cake layer or layers after they have been placed on the plate. One form of the invention is shown in the accompanying drawings.

FIG. 1 is a perspective view of a cake frosting device according to the present invention in use;

FIG. 2 is a top plan view of the device;

FIG. 3 is a sectional view on line 3—3 of FIG. 2;

FIG. 4 is an exploded elevational view of the device in the direction of arrows 4—4 of FIG. 2;

FIG. 5 is a fragmentary, enlarged scale exploded sectional view on line 5—5 of FIG. 2.

Shown in the drawings is a cake frosting device 10 according to the present invention. The device comprises generally a cake plate 12 supported on a pedestal 14. Pedestal 14 has a bottom or base 16 adapted to rest on a surface such as the top of a table or counter. Arising from the top surface 18 of base 16 is an upright 20 which in the structure illustrated comprises a plurality of legs 22 which adjoin above the center of base 16. Each leg is notched adjacent its upper end, and in the structure illustrated, three of the notches form shoulders 24 at substantially the same height while the fourth notch forms a higher shoulder 25, the added height in turn forming a lug 26 for a purpose to be described. Each shoulder 24, 25 adjoins a generally vertical upper outer surface 27, these surfaces being circumferentially arranged around the center of base 16. The upper ends of legs 22 are surmounted by a reinforcing and protective disc 28. Also arising from top surface 18 of base 16 on opposite sides of upright 20, are two tabs 30 each of which defines an arcuate guide surface 32 for a purpose to be described.

Plate 12 has an upper face 34 and an under side 36 from which an annular ring 38 depends. Ring 38 is dimensioned to provide an interior surface 40 which fits rotatably around the annular array of upper outer surfaces 27 of legs 22. Ring 38 also has a bottom surface 42 with an upward notch 44 which interrupts this surface. Notch 44 is vertically and horizontally dimensioned to fit around lug 26 in operative position of plate 12 on pedestal 14. Plate 12 has two holes 46 therethrough, and these holes are positioned generally vertically above tabs 30 when notch lug 26 is engaged within notch 44.

The under side of plate 12 has a pair of downwardly projecting guide surfaces 48 for each hole 46. These surfaces converge from a location generally adjacent the periphery of plate 12 toward hole 46 and adjoin at a juncture or apex 50 inwardly of the hole. Preferably, apex 50 and portions of surfaces 48 immediately adjacent thereto are generally tangential of the hole. In the structure illustrated, guide surfaces 48 and their juncture 50 are formed by a pair of V-disposed ribs which project downwardly from a plate 54 on the under side of plate 12. Each plate 54 has an opening which forms a part of hole 46. Also projecting downwardly from the under side of plate 12, are a plurality of legs 56 which are adapted to support plate 12 on a table or counter top when the plate is removed from pedestal 14.

A plurality of pins 58 are provided, each of which has an annular head 60 dimensioned to fit slidably in a guide surface 32. The shanks of pins 58 are dimensioned to pass slidably through holes 46 and preferably are long enough to penetrate through two layers of cake and well into a third layer.

In use, it will be assumed that intially plate 12 is removed from pedestal 14. To prepare device 10 for frosting a cake, plate 12 is positioned above pedestal 14, generally as shown in FIG. 4, and is then lowered so that ring 38 passes downwardly around surfaces 27 on legs 22 until lower surface 42 on the ring bottoms against shoulders 24. If notch 44 in the ring is not vertically aligned with lug 26, surface 42 will also engage shoulder 25; and since this shoulder is higher than shoulders 24, plate 12 will feel insecure or wobbly on its support. This tells the user that plate 12 is not in its proper rotative position on pedestal 14. The user thereupon rotates plate 12 until notch 44 aligns vertically with lug 26, whereupon the plate drops into securely supported relation with lower surface 42 of ring 38 bearing against all shoulders 24 and with the top of notch 44 bearing against shoulder 25. Lug 26 becomes engaged within notch 44 to secure plate 12 in a rotative position in which holes 46 are positioned generally vertically above guides 32. Inner surface 40 engages outer upper surfaces 27 of legs 22 to secure plate 12 against lateral movement relative to pedestal 14.

Holes 46 are visible from above plate 12. A pin 58 is now oriented generally horizontally and inserted beneath plate 12 in general radial alignment with a hole 46, with the end of the pin held upwardly against plate 54. The pin is then moved laterally inwardly, and if its end is not exactly aligned with hole 46, it engages one of the guide surfaces 48 which guides the pin end to the hole. Apex 50 obstructs inward movement of the pin when its end is aligned with hole 46 (FIG. 2). The pin is then swung downwardly until its head 60 contacts guide surface 32. During this movement, the upper end of the pin penetrates into hole 46. Then while maintaining contact of head 60 against guide surface 32, the pin is lowered until head 60 rests on upper surface 18 of base 16.

The pin is now in a substantially vertical orientation beneath hole 46, and when it is released, it will remain there because of the lateral support on the upper and lower ends of the pin provided by its engagement within hole 46 and with guide surface 32. Another pin 58 is positioned beneath the other hole 46 and against the other guide surface 32 by the same procedure.

A cake layer L is placed on upper face 34 of plate 12 either before or after the pin positioning procedure just described. With the layer in place, pins 58 are manually raised so that their upper ends penetrate the layer. Holes 46 and guides 32 cooperate to insure movement of the pins in a substantially vertical direction. The pins are raised until they penetrate well into the cake layer and are then released. Friction between the pins and the cake holds the pins in their elevated position. If the pins penetrate through the top of the layer during the elevating step, they can simply be retracted until their upper ends are somewhat below the layer top. Once the pins have impaled layer L, they hold the layer securely in its lateral position on face 34 of plate 12. Icing may now be applied to the sides and top of the layer as by a spatula S without the necessity of manually holding the layer in place, and without the layer sliding around on face 34.

After the first layer has been iced, a second layer is then placed atop the first and pins 58 are further elevated to impale the second layer. The second layer may then be iced without the necessity of manually holding it in place and without its slipping around on the first layer. A third layer is then placed atop the second, pins 58 further elevated, and the icing procedure repeated. After all the layers have been iced, pins 58 are removed therefrom simply by drawing them downwardly until their heads engage upper surface 18 of base 16 and then swinging the pins upwardly and outwardly during which movement the pins withdraw from holes 46.

Should it be desired to transfer plate 12 together with its iced cake layers to another support such as a table or counter top, the plate is simply lifted vertically upwardly to disengage ring 38 from surfaces 27 and the plate is lowered to engage its legs 56 against the desired support. The legs provide a vertical space between the support and under side 36 of plate 12 to accommodate the user's fingers during this and similar transfer procedures.

From the foregoing description it will be apparent that a user can carry out all of the manipulations of plate 12 relative to pedestal 14 and all of the manipulations of pins 58 relative to the plate and pedestal by feel while standing over device 10, and without the necessity of stooping or bending over to ascertain whether the various elements at various times are in their correct relative positions and orientation. Pins 58 hold the cake layers in their correct lateral position and the tops of the layers as well as their sides can be iced without having to work around the pins. The pins are removed from the cake without the necessity of disturbing the stable support of plate 12 on pedestal 14.

When the plate is removed from the pedestal, all attention can be focused on a simple, short vertical move i.e., by the width of ring 38, without the necessity of disengaging the cake from the pins during such movement. Frosting device 10 is thus very convenient to use and eliminates the sources of mishaps which occur in conventional devices during the icing procedure and subsequent handling of plate 12 and the iced cake.

Plate 12 and pedestal 14 can be made of any of a number of very inexpensive commercially available plastic materials such as nylon. Pins 58 and their heads 60 similarly can be formed of plastic or, for example, could be made of stainless steel with a suitable head 60 formed of the wire itself or formed of a plastic wood, or the like.

I claim:

1. A cake frosting device which comprises,
   a plate having an upper face adapted to support a cake layer and having an under side,
   a pedestal adapted to rest on a supporting surface and to support said plate in a position elevated above said surface,
   said plate having a plurality of apertured portions, each of which opens at said upper face and said under side,
   a plurality of pins each having end portions and each being dimensioned to slide generally vertically through said apertured portions,
   said under side being provided with means forming a guide associated with each apertured portion,
   each guide having surface portions positioned for engagement by a said pin moved generally horizontally beneath said plate in alignment therewith,
   said surface portions of each guide extending toward a said apertured portion and being effective responsive to engagement therewith of a pin so moving to guide said pin to a said apertured portion,
   support means positioned generally vertically below each apertured portion,
   a said pin in a generally vertical orientation beneath a said apertured portion being detachably engageable in vertically supported relation with said support means,
   each pin having such a length that when it is so engaged with said support means, an upper portion of said pin at least partially enters said apertured portion.

2. A cake frosting device which comprises,
   a plate having an upper face adapted to support a cake layer and having an under side,
   a pedestal adapted to rest on a supporting surface and to support said plate in a position elevated above said surface,
   said plate having a plurality of apertured portions, each of which opens at said upper face and said under side,
   a plurality of pins each having end portions and each being dimensioned to slide generally vertically through said apertured portions,
   said under side being provided with means forming a guide associated with each apertured portion,
   each guide being engageable by a said pin moved generally horizontally beneath said plate in alignment therewith,
   each guide being effective responsive to engagement therewith of a pin so moving to guide said pin to a said apertured portion,
   when said plate is so supported on said pedestal, each apertured portion being positioned generally vertically above support means adapted to provide vertical support for a said pin which is in a generally vertical orientation,
   each pin having such a length that when it is so oriented beneath a said apertured portion, an upper portion of said pin at least partially enters said apertured portion, each said guide comprising means defining a pair of generally vertical guide surfaces positioned for engagement by an end portion of a said pin,
said guide surfaces converging toward said apertured portion from locations distal thereof.

3. The structure defined in claim 2 wherein said guide surfaces adjoin at a juncture adjacent said apertured portion, said juncture forming an obstruction to such movement of said end portion of a said pin when said end portion is aligned with said apertured portion.

4. The structure defined in claim 3 wherein said juncture and the portions of said guide surfaces closely adjacent thereto are generally tangential of said apertured portion.

5. The structure defined in claim 3 wherein said guide surfaces and juncture thereof comprise portions of a pair of ribs arranged in a V on said under side.

6. The structure defined in claim 5 wherein said locations distal of said apertured portion are generally adjacent outer peripheral portions of said plate.

7. The structure defined in claim 1 wherein said support means comprises upwardly disposed surface means on said pedestal adapted to supportingly engage the lower end of a said pin.

8. The structure defined in claim 7 wherein said pedestal has, adjacent said surface means, means providing an abutment positioned to engage a side portion of a said pin when said pin is so oriented.

9. The structure defined in claim 8 wherein said pedestal has a bottom so adapted to rest on a supporting surface and which has an upper side providing said surface means, said abutment being provided on said upper side.

10. A cake frosting device which comprises,
a plate having an upper face adapted to support a cake layer and having an under side,
a pedestal adapted to rest on a supporting surface and to support said plate in a position elevated above said surface,
said plate having a plurality of apertured portions, each of which opens at said upper face and said under side,
a plurality of pins each having end portions and each being dimensioned to slide generally vertically through said apertured portions,
said under side being provided with means forming a guide associated with each apertured portion,
each guide being engageable by a said pin moved generally horizontally beneath said plate in alignment therewith,
each guide being effective responsive to engagement therewith of a pin so moving to guide said pin to a said apertured portion,
when said plate is so supported on said pedestal, each apertured portion being positioned generally vertically above support means adapted to provide vertical support for a said pin which is in a generally vertical orientation,
each pin having such a length that when it is so oriented beneath a said apertured portion, an upper portion of said pin at least partially enters said apertured portion,
said pedestal having a bottom so adapted to rest on a supporting surface and having an upper side providing said support means and being adapted to supportingly engage the lower end of a said pin,
and means providing an abutment positioned to engage a side portion of a said pin when said pin is so oriented,
said abutment projecting upwardly from said upper side and forming a guideway effective to slidably guide at least initial upward movement of a said pin in a generally vertical direction as said pin moves upwardly through a said apertured portion.

11. The structure defined in claim 10 wherein the lower end of each pin has a head, said guideway and head having a complemental configuration to facilitate such generally vertical guiding of a said pin.

12. The structure defined in claim 11 wherein said head and guideway have generally arcuate configuration.

13. A cake frosting device which comprises,
a plate having an upper face adapted to support a cake layer and having an under side,
a pedestal adapted to rest on a supporting surface and to support said plate in a position elevated above said surface,
said plate having a plurality of apertured portions, each of which opens at said upper face and said under side,
a plurality of pins each having end portions and each being dimensioned to slide generally vertically through said apertured portions,
said under side being provided with means forming a guide associated with each apertured portion,
each guide being engageable by a said pin moved generally horizontally beneath said plate in alignment therewith,
each guide being effective responsive to engagement therewith of a pin so moving to guide said pin to a said apertured portion,
when said plate is so supported on said pedestal, each apertured portion being positioned generally vertically above support means adapted to provide vertical support for a said pin which is in a generally vertical orientation,
each pin having such a length that when it is so oriented beneath a said apertured portion, an upper portion of said pin at least partially enters said apertured portion,
each said apertured portion comprising a hole through said plate spaced from the periphery of said plate,
each said guide comprising a pair of guide surfaces on said under side which converge in a direction from the periphery of said plate toward said hole and which are positioned and dimensioned to be engaged by a said end portion of a pin so moving,
said guide surfaces adjoining it at an apex effective to obstruct such movement when said end portion is adjacent said hole,
said pedestal having a base with an upper surface portion which provides said support means,
said base also having means engageable with a pin so oriented to provide lateral support for the pin to maintain said orientation,
said pedestal having upright means on said base and on which said plate is removably supported,
said upright means and under side of said plate having means interengageable to secure said plate in a rotative position on said pedestal wherein said holes are located generally vertically above said support means and lateral support.

14. The structure defined in claim 13 wherein said under side and upright means are provided with members engagable upon lowering said plate relative to said pedestal to secure said plate laterally in position on said upright means.

15. The structure defined in claim 14 wherein said members comprise an annular ring depending from said under side and annular means adjacent the top of said upright means.

16. The structure defined in claim 15 wherein said upright means comprises a plurality of legs having upper outer edge portions which cooperate to form said annular means, each leg having a shoulder below said portion thereof, at least one of said shoulders being higher than others of said shoulders, the bottom of said ring bearing against said other shoulders when said plate is supported on said pedestal, said ring having at least one generally vertical slot therein within which said higher shoulder fits to provide said interengagable means for securing said plate in said rotative position.

17. The structure defined in claim 16 wherein an annular disc is disposed atop said legs and is fittable within said ring.

18. The structure defined in claim 1 wherein said under side is provided with a plurality of downward projections which form legs adapted to support said plate above a supporting surface when said plate is removed from said pedestal.

19. The structure defined in claim 1 wherein said pins have a length adequate to project from a location below said under side to a location upwardly of said upper face a distance sufficient to impale at least three cake layers stacked on said plate.

* * * * *